PULSE REGENERATOR CIRCUIT

Filed April 28, 1945 2 SHEETS—SHEET 1

INVENTOR.
Warren H. Bliss
BY H. G. Grover
ATTORNEY.

Dec. 4, 1951

W. H. BLISS 2,577,444

PULSE REGENERATOR CIRCUIT

Filed April 28, 1945

2 SHEETS—SHEET 2

INVENTOR.
Warren H. Bliss
BY H. G. Grover
ATTORNEY.

Patented Dec. 4, 1951 2,577,444

UNITED STATES PATENT OFFICE 2,577,444

PULSE REGENERATOR CIRCUIT

Warren H. Bliss, Riverhead, N. Y., assignor to Radio Corporation of America, a corporation of Delaware Application April 28, 1945, Serial No. 590,822

12 Claims. (Cl. 178—68)

The present invention relates to a system for converting relatively short keyed pulses into conventionally longer duration telegraph keyed characters, such as dots and dashes.

One method of radio telegraph communication consists in converting, at the transmitting station, conventional dots and dashes of the telegraph code into shorter duration equal length pulses of radio frequency energy which may be keyed in short and long space groups, and these shorter pulses radiated toward the remote radio receiving station. Reference is herein made to my United States Patent No. 2,365,450, granted December 19, 1944, and to my copending application Serial No. 491,088, filed June 17, 1943, now United States Patent No. 2,457,974 of January 4, 1949, for a description of this type of system in which the transmitted short spaced pulses are regenerated or reconstructed (rebuilt) at the receiving terminal and converted to again form the conventionally longer code characters.

The present invention comprises an improved pulse regenerator system for use in connection with a radio receiving station for transforming the received relatively short pulses into the usual or conventionally longer duration code characters, such as dots and dashes, so that they may be recorded for transcribing purposes or applied to another circuit for further transmission. This is effected in accordance with the invention by means of a pair of monostable multivibrator or self-restoring electron discharge device trigger circuits, one multivibrator or trigger circuit of which controls the other multivibrator or trigger circuit, and each of which includes two multi-electrode structures. One trigger circuit supplies output pulses which occur in the intervals between the output pulses from the other trigger circuit, and the time constants of these trigger circuits have such values that the combined outputs of both trigger circuits simulate the desired longer duration conventional code characters.

Advantages of the present invention over the telegraph regenerative systems described in my United States patent and my copending application both mentioned above are: The system of the present invention will handle pulse groups consisting of as few as one or two pulses; there need be not synchronous relation between the pulse rate and keying speed; circuits are provided for noise threshold control; amplitude variation in the received or incoming pulses, such as that caused by fading, has no influence on the operation of the pulse generator; and the system of the invention will also handle conventional dot and dash code characters transmitted by radio and remove noise and fading effects.

Figure 1:
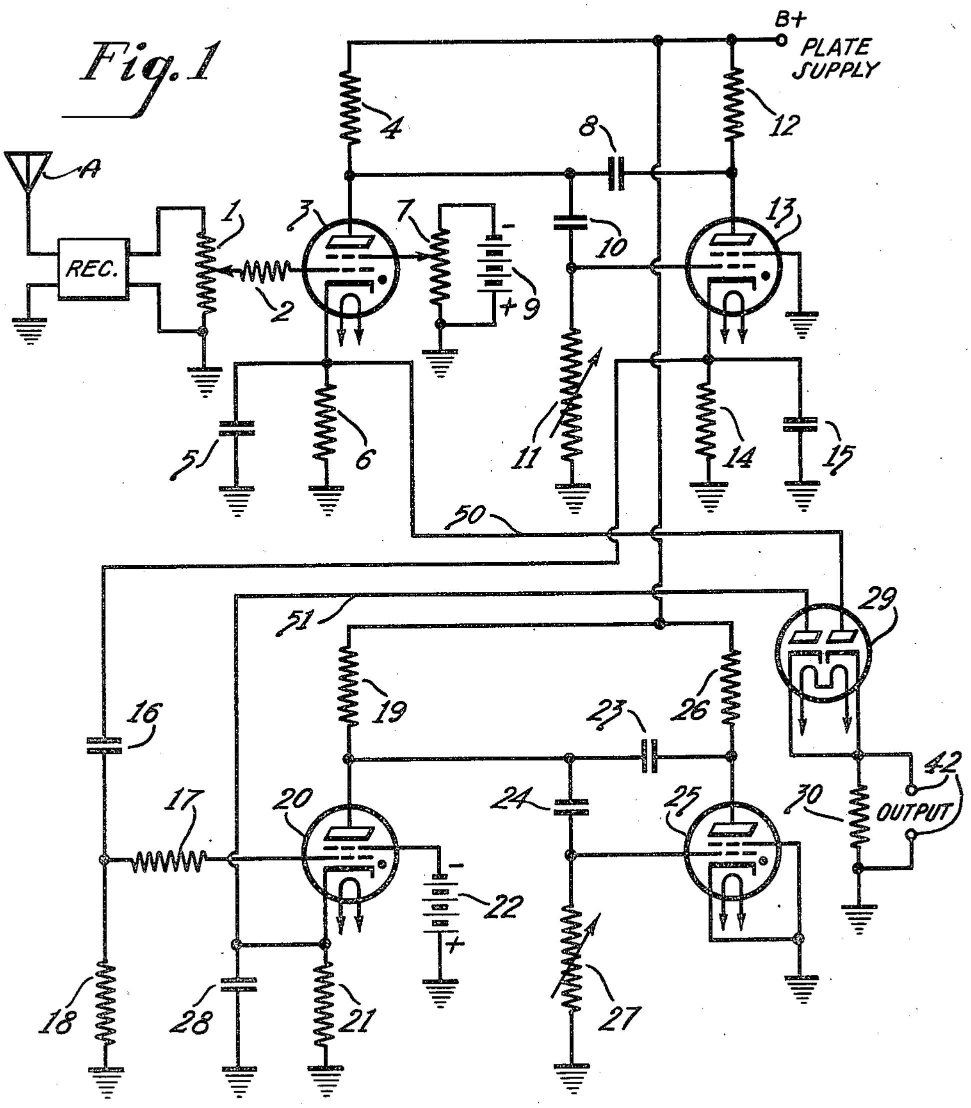
Figure 2:
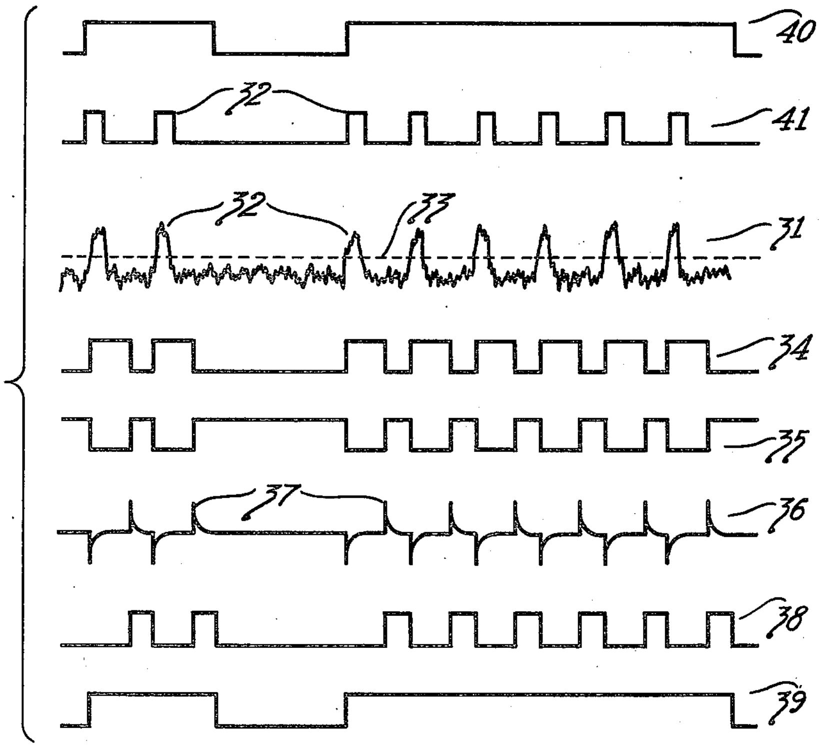

A more detailed description of the invention follows in conjunction with drawings, wherein:

Fig. 1 illustrates circuit details of the pulse regenerator of the invention, and Fig. 2 illustrates a series of wave forms given in explanation of the operation of the system of Fig. 1.

Referring to Fig. 1 in more detail, there is shown a radio telegraph receiver REC connected to an antenna A. The output of this receiver is connected to a pulse regenerator constituting the invention. Receiver REC and antenna A are representative of any suitable apparatus for performing their intended functions, such as a diversity receiving system in which a plurality of antennas are connected to the inputs of a plurality of superheterodyne receivers whose outputs are combined. The pulse reproducer includes four gaseous tetrode tubes 3, 13, 20 and 25 and a dual diode vacuum tube 29. Tetrodes 3 and 13 operate together in an alternate conduction, monostable multivibrator, or self-restoring trigger circuit; while tetrodes 20 and 25 operate similarly in another monostable multivibrator or self-restoring trigger circuit. The circuit of tetrodes 3 and 13 may be called a "reshaper" because the tetrodes convert the shape of an input pulse applied to the grid of tube 3 into a substantially square or rectangular pulse, irrespective of the shape of the received initiating pulse. Tetrode 3 has a resistor 4 connected in series with its anode circuit, and a resistor 6 connected in its cathode circuit. The control grid of this tetrode is connected to the output of the receiver REC through a series connected grid resistor 2 and an input potentiometer 1. Adjustable bias voltage is supplied to the screen grid of tetrode 3 by means of battery 9 and potentiometer 7. Tetrode 13 has an anode resistor 12 and a cathode resistor 14. The anode of tetrode 3 is connected to the anode of tetrode 13 through a commutating condenser 8, and to the control grid of tetrode 13 through condenser 10. The anode resistors 4 and 12 are connected to the B+ anode supply. A variable resistor 11 connects the control grid of tetrode 13 to ground. The screen grid of tube 13 is also grounded. Cathode resistors 6 and 14 are by-passed to ground by condensers 5 and 15, respectively, in order to improve the rectangular pulse wave form obtained from the "reshaper" or trigger circuit. Normally (with no signal coming in), gas tube 3 is non-conducting while gas tube 13 is in a state of conduction. The application of a signal or initiating pulse of positive polarity and of predetermined magnitude to the control grid of tube 3 will cause this tube to conduct, as a result of which tube 13 will cease conducting by virtue of the commutating action of condenser 8. Putting it in other words, an initiating pulse or trigger will fire or trigger the reshaper 3, 13 from the stable state in which tube 3 is normally non-conducting and tube 13 normally conducting to the active or unstable state in which the current passing conditions of these two tubes are reversed. Output energy from the triggers 3 and 13 may be taken from the cathodes of these tubes. The duration of the active period of the trigger circuit is controlled by the values of condenser 10 and resistor 11.

The operation of the trigger circuit 3, 13 may be better understood from the following explanation: With the stable condition of the self-restoring trigger circuit, tube 13 is conducting while tube 3 is non-conducting. For purposes of explanation, the cathodes of these two tubes may be assumed to be connected directly to ground since the cathode resistors 6 and 14 are included solely for the purpose of providing an easy means of deriving output signals. Because of the low voltage drop from anode to cathode (about 8 volts for these type 2050 tetrodes) the potential at the anode of tube 13 is almost at ground potential (plus 8 volts, while B+ is, say, +250 volts) during the stable condition. This stable condition persists until the control grid of tube 3 is momentarily caused to become slightly more positive than the cut-off, or more strictly speaking, the firing point.

When tube 3 is triggered or fired, it instantly starts to conduct and draw anode current, the value of which is controlled by resistor 4. When this conduction begins, the anode potential of tube 3 drops from +250 volts (B+ supply value) to about +8 volts (anode-to-cathode drop) and remains at that value as long as conduction continues in tube 3. At the instant of this drop in potential, the conduction through tube 13 is "snuffed" out by the action of condenser 8. A condenser is an electrical device which offers opposition to sudden changes in potential across its terminals just as a choke coil offers opposition to sudden changes in current through it.

In the stable condition of the trigger circuit, the left hand side of condenser 8 is at +250 volts and the right hand side is at +8 volts. When tube 3 fires and its anode drops from +250 to +8 volts, the left hand side of condenser 8 drops the same amount. Since the potential across condenser 8 cannot change instantaneously, the right hand side of condenser 8 must also drop from wherever it is (+8 volts) to a value 250—8=242 volts lower. Since the right hand side of condenser 8 is connected to the anode of tube 13, the anode of this tube is driven (momentarily at least) to a negative value of 242—8=234 volts. Since conventional tubes cannot conduct when the anode is negative with respect to the cathode, tube 13 ceases conduction. Condenser 8 is usually quite small, for example 0.0015 μfd., and need be only large enough to hold the anode of tube 13 negative long enough for deionization of the gas in this tube. After this switching or exchange of states of conduction of the two tubes, condenser 8 quickly assumes its new status of potentials. The left side stays at +8 volts and the right hand side rises to +250 volts. The unstable or active state of affairs now exists and condenser 8 holds its new status quo until tube 13 is refired at a later time as will now be explained.

Condenser 10 and resistor 11 do not start their function until the above procedure has taken place. In the stable status, there is no current flowing through resistor 11 and, hence, the potential of the control grid of tube 13 and likewise the potential of the lower side of condenser 10 are at essentially zero or ground value. The upper side of condenser 10 is at +250 volts, which is the same potential as the left side of condenser 8.

When tube 3 starts conduction, condenser 10 performs in a manner similar to condenser 8 but condenser 10 drives the control grid of tube 13 to a negative value far below the cut-off or firing point. Since condenser 10 is much larger than condenser 8, it holds the control grid of tube 13 at a low negative value for an appreciable length of time. Tube 13 is thus prevented from refiring even though its anode has already recovered from the action of condenser 8. After an interval of time determined by the size of condenser 10 and the size of resistor 11, the potential of the lower side of condenser 10 does rise to such a value that tube 13 refires, and condenser 8 acts to "snuff out" tube 3. The circuit is then in the stable state again.

The screen grid voltages on these tubes 3 and 13 can be adjusted so as to set the control grid firing potential at any desired value over a wide range of conditions. In the circuit of Fig. 1, the screen grid of tube 13 is operated at ground potential while the screen grid of tube 3 is operated at a negative value.

From the above explanation it may be said that the functions of condensers 8 and 10 are entirely separate and independent. Condenser 8 acts as a switch such that when the non-conducting tube starts conducting it switches off the other tube. Condenser 10 holds tube 13 in a state of non-conduction and together with resistor 11 controls the length of the non-conduction period of tube 13.

The circuit connections for gas tetrodes 20 and 25 are similar to those of tubes 3 and 13 with certain exceptions given below. Tubes 20 and 25 also comprise a self-restoring trigger circuit. Tetrode 20 is normally non-conducting, while tetrode 25 is normally conducting. The input to the control grid of tube 20 is taken from the cathode of tube 13 by way of condenser 16 and resistors 17 and 18, as shown. The screen grid of tetrode 20 is supplied with a fixed bias from battery 22 by virtue of a connection to the negative terminal of this battery. The cathode of tetrode 25 is connected directly to ground. It should be noted that the anodes of tubes 20 and 25 are connected together by way of commutating condenser 23, and that the anode of tube 20 is also connected to the control grid of tube 25 by way of condenser 24. Condenser 28 is a by-pass condenser across the cathode resistor 21 to improve the rectangular pulse wave form obtained from this cathode resistor. Resistors 19 and 26 individually connect the anodes of tubes 20 and 25 to the B+ anode supply. A variable resistor 27 connects the control grid of tube 25 to ground. The duration of the active period of the trigger circuit 20, 25 is controlled by the values of condenser 24 and resistor 27.

Outputs from the two trigger circuits 3, 13 and 20, 25 are combined in a dual diode tube 29, and this combined output delivered to leads 42 connected across resistor 30 in the cathode circuits of the dual diode. It should be noted that one anode of the dual diode is connected by way of lead 50 to the upper terminal of cathode resistor 6, while the other anode of dual diode 29 is connected by way of lead 51 to the upper terminal of cathode resistor 21.

A better understanding of the operation of the pulse regenerator of Fig. 1 may be had by referring to the graphical representation of Fig. 2. Fig. 2 shows a series of curves 40, 41 and 31 to 39, inclusive, representing voltage variations at various points designated hereinafter. Let us assume that the letter "A" in conventional code characters originates at the remotely located telegraph transmitting station. This letter "A" is shown in curve 40 and comprises a dot, a space, and a dash. At the transmitter, two short pulses may, for example, be transmitted for each basic unit of the signal, so that the letter "A" will be converted into the form of two short equal length spaced pulses for the dot, and six short equal length spaced pulses for the dash. This is shown in curve 41. Pulses of radio frequency energy corresponding to curve 41 are those radiated from the remote telegraph receiving station to be received by the system of Fig. 1. Curve or wave form 31 shows a typical incoming signal for the letter "A" as observed at the output terminals of the receiver REC and impressed upon the control grid of the tetrode 3. The first two spaced pulses 32 convey the dot of the code for the letter "A" and the second group of six spaced pulses 32 conveys the dash. Noise is shown between the received pulses and is represented by the jagged lines. The receiver output represented by curve 31 is applied to the control grid of tetrode 3 by means of potentiometer 1.

Tetrode 13 is normally (no signal coming in) in a state of conduction, while tetrode 3 is normally non-conducting. When the system is properly adjusted, each incoming pulse (as it is applied to the control grid of tetrode 3) fires or triggers this tetrode into a state of conduction. When tetrode 3 starts conduction, tetrode 13 ceases conduction because of the commutating action of interconnecting condenser 8. The conduction period of tetrode 3 is controlled by the values of condenser 10 and resistor 11. When tetrode 3 fires, the potential of the control grid of tetrode 13 is reduced to a low value which delays reconduction in tetrode 13 for a short interval of time. However, the time constant of the control circuit is adjusted so that tetrode 13 refires shortly before the arrival time of the next pulse. When tetrode 13 becomes conductive, tube 3 will become non-conductive. Line 34 shows the conduction versus time relation for tetrode 3. This line is also the wave form of voltage developed at the cathode of tetrode 3. Line 35, likewise, is the wave form of potential at the cathode of tetrode 13.

The bias on the screen grid of tetrode 3, adjusted by potentiometer 7, is the noise threshold control. This must be set at such a level that the noise peaks occurring between the signal pulses 32 of curve 31 will not cause false operation of tetrode 3. Dotted line 33 illustrates a suitable threshold setting, such that all pulses rising above this level will be utilized for firing gas tube 3, while lower amplitude noise peaks will have no effect. It should also be noted that variation in signal pulse amplitude does not modify the circuit operations as long as this amplitude does not drop below the theshold level.

To fully reconstruct the signal; that is, to reproduce the original wave form of line 40, the short gaps in the wave form of line 34 between adjacent pulses of each dot or dash must be filled in. Tetrodes 20 and 25 accomplish this by operating in a manner similar to tetrodes 3 and 13; that is, one tube only of the pair is in a state of conduction at one time. Triggering pulses to fire tetrode 20 are derived from the output of tetrode 13 by means of a connection including condenser 16 and resistor 18. The derived wave form is shown in line 36 and consists of a series of positive and negative pulses resulting from differentiation of output of tetrode 13. The positive pulses 37 occur each time tetrode 3 terminates its conduction period and the pulses are applied to fire tetrode 20 (tetrode 20 being initially non-conducting while tetrode 25 is conducting). The firing of tube 20 causes tube 25 to cease conducting for an interval of time depending upon the time constants of the circuit. Tetrode 25 resumes conduction a short interval of time after ceasing conduction, this interval being controlled by the values of condenser 24 and resistor 27. Line 38 represents the cathode potential variation of tetrode 20 which is used as the output of this tube.

To develop the fully reproduced signal shown as line 39, the regenerated signal output of tetrode 3 (line 34) is combined with the output wave of tetrode 20 (line 38) by means of dual diode vacuum tube 29. The reproduced dot and dash combination (letter "A" in the illustrations of Fig. 2) is developed as a voltage across output resistor 30, and is shown in line 39.

What is claimed is:

1. In a pulse communication system, a signal regenerator circuit for rebuilding the received pulses into longer duration pulses, said regenerator circuit including first and second self-restoring electron discharge device trigger circuits each having a stable and an active state, each providing a pulse output of substantially rectangular wave form in response to a triggering input pulse, a connection between said trigger circuits for firing said second trigger circuit at the time said first trigger circuit restores itself to its stable state, and means for combining the outputs from both trigger circuits.

2. In a pulse communication system, a signal regenerator circuit for rebuilding the received pulses into longer duration pulses, said regenerator circuit including first and second self-restoring electron discharge device trigger circuits each having a stable and an active state, each providing a pulse output of substantially rectangular wave form in response to a triggering input pulse, a connection between said trigger circuits for the firing said second trigger circuit at the time said first trigger circuit restores itself to the stable state, the time constants of said trigger circuits having such values that said second trigger circuit provides output pulses of a duration sufficient to bridge the gaps or spaces between certain output pulses of said first trigger circuit, a rectifier electrode structure in circuit with the output from each trigger circuit, and means for obtaining the combined outputs from said rectifier structure.

3. In a pulse communication system, a signal regenerator circuit for rebuilding the received pulses into longer duration pulses, said regenerator circuit including first and second self-restoring electron discharge device trigger circuits, each providing a pulse output of substantially rectangular wave form in response to a triggering input pulse, a connection between said trigger circuits for firing said second trigger circuit from said first trigger circuit, said connection including a differentiator in circuit therewith for causing said second trigger circuit to operate substantially only when said first trigger circuit restores itself to normal and having been fired, the time constants of said second trigger circuit being such that it provides output pulses of a duration sufficient to bridge the gaps or spaces between certain output pulses from said first trigger circuit, and means for combining the outputs from both trigger circuits.

4. In a pulse communication system, a signal regenerator circuit for rebuilding the received pulses into longer duration pulses, said regenerator circuit including first and second self-restoring electron discharge device trigger circuits, each providing a pulse output of substantially rectangular wave form in response to a triggering input pulse, a connection between said trigger circuits for controlling the operation of said second trigger circuit from said first trigger circuit, said connection including a differentiator in circuit therewith for causing said second trigger circuit to operate substantially only when said first trigger circuit restores itself to normal and having been fired, the time constants of said second trigger circuit being such that it provides output pulses of a duration sufficient to bridge the gaps or spaces between certain output pulses from said first trigger circuit, and a dual diode coupled to output electrodes of both trigger circuits for combining the output pulses from both trigger circuits.

5. In a pulse communication system, a signal regenerator circuit for rebuilding the received pulses into longer duration pulses, said regenerator circuit including first and second self-restoring electron discharge device trigger circuits, each providing a pulse output of substantially rectangular wave form in response to a triggering input pulse, a connection between said trigger circuits for firing said second trigger circuit at the time said first trigger circuit restores itself to normal, said first trigger circuit comprising a pair of interconnected tetrode devices, a source of unidirectional potential coupled to the screen grid of the input tetrode device of said first trigger circuit for supplying a bias which determines the operating threshold, and means for combining the outputs from both trigger circuits.

6. In a pulse communication system, a signal regenerator circuit for rebuilding the received pulses into longer duration pulses, said regenerator circuit including first and second self-restoring gaseous electron discharge device trigger circuits, each providing a pulse output of substantially rectangular wave form in response to a triggering input pulse, each of said trigger circuits comprising a pair of interconnected electrode structures, a connection between said trigger circuits for firing said second trigger circuit at the time said first trigger circuit restores itself to normal, and rectifier means for combining the outputs from both trigger circuits.

7. A pulse telegraph communication system wherein equal length pulses, each of a time duration shorter than that of a dot, are transmitted; a receiving terminal including a regenerator system for rebuilding the received pulses into longer duration conventional code characters, said regenerator system comprising an electron discharge device trigger circuit for reshaping the received pulses into substantially rectangular shaped pulses, said trigger circuit having a stable and an active state and comprising a pair of interconnected multi-electrode structures, means in circuit with said trigger circuit for preventing its operation on pulses below a predetermined magnitude, another electron discharge device trigger circuit also having a stable and an active state and coupled to and under control of said first trigger circuit by virtue of a coupling which causes the second trigger circuit to operate substantially only on the termination of the active state of said first trigger circuit, and means for combining the outputs from both trigger circuits in a common utilization circuit.

8. A pulse telegraph communication system wherein equal length pulses, each of a time duration shorter than that of a dot, are transmitted, a receiving terminal including a regenerator system for rebuilding the received pulses into longer duration conventional code characters, said regenerator system comprising an electron discharge device trigger circuit for reshaping the received pulses into substantially rectangular shaped pulses, said trigger circuit having a stable and an active state and comprising a pair of interconnected multi-electrode structures, means in circuit with said trigger circuit for preventing its operation on pulses below a predetermined magnitude, another electron discharge device trigger circuit also having a stable and an active state and coupled to and under control of said first trigger circuit by virtue of a coupling which causes the second trigger circuit to operate substantially only on the termination of the active state of said first trigger circuit, and means for combining the outputs from both trigger circuits in a common utilization circuit, the time constants of said second trigger circuit being such that it provides output pulses of a duration shorter than the spacing between said equal length pulses but sufficient to fill in the gaps or spaces between certain output pulses from the first trigger circuit.

9. In a pulse communication system of the type wherein groups of time spaced relatively short pulses of given nature are transmitted to represent longer pulses of the same nature, the transmitted short pulses being subject to distortion during transmission, a pulse reproducing circuit arrangement including a monostable multivibrator circuit having a stable and an active state, means to apply received signals to said multivibrator circuit whereby said short pulses as received are regenerated in essentially the same form as transmitted, a further monostable multivibrator circuit having a stable and an active state and being coupled to the first said multivibrator circuit to be activated upon said first multivibrator circuit being restored to the stable state, the active period of said further multivibrator circuit being substantially equal to the time spacing between the short pulses of each of said groups as regenerated, and a circuit directly connected to both of said multivibrator circuits to combine the outputs thereof to reproduce said longer pulses.

10. In a pulse communication system of the type wherein groups of time spaced relatively short pulses of given nature are transmitted to represent longer pulses of the same nature, the transmitted short pulses being subject to distortion during transmission, a pulse reproducing circuit arrangement including a monostable multivibrator circuit having a stable and an active state producing a substantially rectangular output waveform, means to apply received signals to said multivibrator circuit whereby said short pulses as received are regenerated in essentially the same form as transmitted, a further monostable multivibrator circuit having a stable and an active state producing a substantially rectangular output waveform and being coupled to the first said multivibrator circuit to be activated upon said first multivibrator circuit being restored to the stable state, the active period of said further multivibrator circuit being substantially equal to the time spacing between the short pulses of each of said groups as regenerated by said first monostable multivibrator circuit, unidirectional current passing devices coupled to said multivibrator circuits and having a common output circuit to combine the outputs from both of said multivibrator circuits to reproduce said longer pulses.

11. In a telegraph communication system of the type wherein groups of time spaced relatively short pulses of given nature and rectangular waveform are transmitted to represent longer pulses of the same nature and waveform, there being distortion of said transmitted short pulses as received over the medium of transmission, a pulse reproducing circuit arrangement including a monostable multivibrator circuit having a stable and an active state producing an output of substantially rectangular waveform, means to apply received signals to said multivibrator circuit whereby said short pulses as received are regenerated in essentially the same form as transmitted, a further monostable multivibrator circuit coupled to the first said multivibrator circuit to be activated upon said first multivibrator circuit being restored to the stable state, the active period of said further multivibrator circuit being substantially equal to the time spacing between the short pulses of each of said groups as regenerated, and a pair of rectifier devices having a common output circuit coupled to both of said multivibrator circuits to combine the outputs of said multivibrator circuits to reproduce said longer pulses.

12. In a telegraph communication system of the type wherein groups of time spaced relatively short pulses of given nature and rectangular waveform are transmitted to represent longer pulses of the same nature and wave form, there being distortion of said transmitted short pulses as received over the medium of transmission, a pulse reproducing circuit arrangement including a monostable multivibrator circuit having a stable and an active state producing an output of substantially rectangular waveform, means to apply received signals to said multivibrator circuit whereby said short pulses as received are regenerated in essentially the same form as transmitted, a further monostable multivibrator circuit coupled to the first said multivibrator circuit to be activated upon said first multivibrator circuit being restored to the stable state, the active period of said further multivibrator circuit being substantially equal to the time spacing between the short pulses of each of said groups as regenerated in the first said circuit, an output load device, and rectifier devices coupling said load device to both of said multivibrator circuits to combine the outputs thereof to reproduce said longer pulses.

WARREN H. BLISS.

REFERENCES CITED

The following references are of record in the file of this patent:

UNITED STATES PATENTS

| Number | Name | Date |
|---|---|---|
| 1,926,821 | Stansbury | Sept. 12, 1933 |
| 1,954,028 | Stansbury | Apr. 10, 1934 |
| 2,050,059 | Koch | Aug. 4, 1936 |
| 2,119,389 | Hunt | May 31, 1938 |
| 2,226,706 | Cawein | Dec. 31, 1940 |
| 2,272,070 | Reeves | Feb. 3, 1942 |
| 2,273,193 | Heising | Feb. 17, 1942 |
| 2,286,450 | White | June 16, 1942 |
| 2,299,272 | Hallden | Oct. 20, 1942 |
| 2,331,124 | Livingston | Oct. 5, 1943 |
| 2,365,450 | Bliss | Dec. 19, 1944 |
| 2,372,106 | Nagel | Mar. 20, 1945 |
| 2,385,214 | Livingston | Sept. 18, 1945 |
| 2,402,917 | Miller | June 25, 1946 |
| 2,403,918 | Grosdoff | July 16, 1946 |
| 2,408,794 | Matte | Oct. 8, 1946 |
| 2,432,188 | Bliss | Dec. 9, 1947 |
| 2,441,246 | Miller | May 11, 1948 |

FOREIGN PATENTS

| Number | Country | Date |
|---|---|---|
| 357,532 | Great Britain | Sept. 14, 1931 |